(12) United States Patent
Van Dijk et al.

(10) Patent No.: US 6,743,832 B2
(45) Date of Patent: Jun. 1, 2004

(54) THERMOSETTING RESIN COMPOSTITION OF A RADICALLY CURABLE RESIN MIXTURE AND CARBON FIBRE

(75) Inventors: Hans Klaas Van Dijk, Sittard (NL); Gerardus Hubertus Anna Janse, Maasbracht (NL); Hans Hubertus Henricus Hornman, Geleen (NL); Antonius Franciscus Maria Josephus Van Der Ploeg, Susteren (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/220,887

(22) PCT Filed: Mar. 5, 2001

(86) PCT No.: PCT/NL01/00182

§ 371 (c)(1),
(2), (4) Date: Feb. 6, 2003

(87) PCT Pub. No.: WO01/66637

PCT Pub. Date: Sep. 13, 2001

(65) Prior Publication Data

US 2003/0166744 A1 Sep. 4, 2003

(30) Foreign Application Priority Data

Mar. 7, 2000 (NL) .............................................. 1014574
May 23, 2000 (NL) .............................................. 1015271

(51) Int. Cl.$^7$ .............................. G21F 1/10; C08K 9/00; C08K 7/06; C08J 5/06
(52) U.S. Cl. ........................ 523/137; 523/215; 523/438; 523/468; 524/847
(58) Field of Search ................................ 523/137, 215, 523/438, 468; 524/847

(56) References Cited

U.S. PATENT DOCUMENTS

| | | | | |
|---|---|---|---|---|
| 3,964,952 A | * | 6/1976 | Brie et al. .................. | 156/296 |
| 4,822,665 A | * | 4/1989 | Scholz et al. ............... | 428/222 |
| 6,508,906 B1 | | 1/2003 | Bradish | |
| 2003/0099734 A1 | | 5/2003 | Bradish | |

FOREIGN PATENT DOCUMENTS

| | | | | |
|---|---|---|---|---|
| DE | 2212788 | | 9/1972 | |
| DE | 195 19 241 | | 11/1995 | |
| EP | 234463 | | 9/1987 | |
| EP | 368312 A2 | * | 5/1990 | .............. C08J/5/06 |
| GB | 2290045 A | * | 12/1995 | ........... B29C/70/46 |
| JP | 08311242 A | * | 11/1996 | ............ C08K/3/36 |
| WO | WO 9735715 A1 | * | 10/1997 | .............. B32B/5/04 |

OTHER PUBLICATIONS

Japanese Patent Office machine translation of JP08–311242A (Nov. 26, 1996) Kozuka et al.*
Tsuchiyama, "The Mechanical Properties of Carbon Fiber SMC", *Progress in Science and Engineering of Composties*, 1982, pp. 497–503.

* cited by examiner

*Primary Examiner*—Matthew A. Thexton
(74) *Attorney, Agent, or Firm*—Pillsbury Winthrop LLP

(57) ABSTRACT

The invention relates to a thermosetting resin composition including a radically curable resin mixture of:

a) 50–100 parts by weight of a radically curable resin that also contains a free monomer capable of copolymerising with it;

b) 0–50 parts by weight of a shrink-resistant compound that can also contain an amount of copolymerisable free monomer, the total of (a) and (b) adding up to 100, and 2D-randomly distributed, discontinuous carbon fibres obtained by chopping split, continuous carbon fibre bundles to form packages of carbon filaments, which carbon bundles are provided with a sizing that is at least partially chemically bonded thereto, and with a binder whose solubility at room temperature in the copolymerisable free monomer present in the radically curable resin mixture amounts to at least 10% by weight, the weight percentage of carbon fibres relative to the resin composition being between 5 and 65% by weight, and optionally a filler also being present.

The invention also relates to a process for the preparation of a thermosetting resin composition, as well as processes for the manufacture of 3D-moulded articles therefrom and to 3D-moulded articles themselves.

25 Claims, No Drawings ured resin compositions in the prior art is that in the production of good SMCs relatively large numbers of fibre bundles need to be introduced next to each other (or partly on top of each other) in a chopper in order to produce an SMC with a sufficiently homogeneously distributed and easily wettable fibre bed.

THERMOSETTING RESIN COMPOSTITION OF A RADICALLY CURABLE RESIN MIXTURE AND CARBON FIBRE

CROSS REFERENCE TO RELATED APPLICATION

This application is the National Phase of International Application PCT/NL01/00182 filed Mar. 5, 2001 which designated the U.S., and which further claims benefit to Netherlands application number 1015271, filed May 23, 2003 and Netherlands application number 1014574, filed Mar. 7, 2000, both of which are hereby incorporated in their entirety by reference.

The invention relates to a thermosetting resin composition containing a radically curable resin mixture as matrix, in which 2D-randomly distributed, discontinuous carbon fibres as well as other additives are present. Thermosetting resin compositions are also referred to as compounds. Such compounds can be prepared and processed for example in the form of sheets and are then also referred to as Sheet Moulding Compounds (SMCs). Bulk preparation and processing of the compounds is also possible. The invention also relates to a process for the preparation of a thermosetting resin composition, as well as to processes for the manufacture of 3D-moulded articles from this thermosetting resin composition and to 3D-moulded articles manufactured from a thermosetting resin composition.

Thermosetting resin compositions containing a radically curable resin mixture as matrix, 2D-randomly distributed, discontinuous carbon fibres as well as other additives are described in an article by N. Tsuchiyama, Progress in Science and Engineering of Composites, Proceedings of the ICCM-IV, Tokyo, (1982), volume 1, 497–503. This reference relates to thermosetting resin compositions that are mainly used in SMCs. The resin composition from the article by N. Tsuchiyama is obtained by adding 20–55% by volume of chopped carbon fibre bundles with a K value of between 1–30 to a radically curable resin mixture containing 100 parts by weight of a polyester resin, 1.5 parts by weight of magnesium oxide and 1 part by weight of t-butylperbenzoate. According to the author, SMCs are obtained that show good mechanical properties if the percentage by volume of carbon fibres is between 40 and 45 and the K value of the carbon fibre bundle is 6. When use is made of chopped carbon fibre bundles with a K value higher than 6, products with much poorer mechanical properties are obtained.

The K value of a fibre bundle means the number of filaments present in the fibre bundle divided by a factor of 1000.

A serious drawback of the resin compositions in the prior art is that in the production of good SMCs relatively large numbers of fibre bundles need to be introduced next to each other (or partly on top of each other) in a chopper in order to produce an SMC with a sufficiently homogeneously distributed and easily wettable fibre bed.

The present invention aims to provide a thermosetting resin composition containing a radically curable resin mixture as matrix, 2D-randomly distributed, discontinuous carbon fibres and other additives that does not present the aforementioned drawback.

The resin composition according to the invention is characterized in that the radically curable resin mixture consists of:

(a) 50–100 parts by weight of a radically curable resin that also contains a free monomer capable of copolymerising with it (b) 0–50 parts by weight of a shrink-resistant compound that may also contain an amount of copolymerisable free monomer, the total of (a) and (b) adding up to 100, and in that the 2D-randomly distributed, discontinuous carbon fibres are obtained by chopping split, continuous carbon fibre bundles, which carbon fibre bundles are provided with a sizing that is at least partially chemically bonded thereto and a binder whose solubility at room temperature in the copolymerisable free monomer present amounts to at least 10% by weight and in that the weight percentage of carbon fibres relative to the resin composition is between 5 and 65% by weight, and in that optionally also a filler is present in the resin composition.

Surprisingly, a resin composition has now been obtained in which the carbon fibres are well impregnated and are completely 2D-randomly and homogeneously distributed throughout the resin composition.

A 2D-random distribution of fibre bundles means a distribution in which the direction of the fibre bundles in the plane in which the fibre bundles are distributed shows no regularity.

The chopped, split, continuous carbon fibre bundles with the sizings and binders specified above show an excellent falling behaviour. As a result, it is now very well possible to use significantly fewer bobbins than in the prior art to produce compounds, for example SMCs, with a 2D-randomly distributed and homogeneous and easily wettable fibre distribution. This is especially important in the manufacture of wide SMCs, for example wider than 70 cm, which are essential for the manufacture of very large moulded articles (e.g. car roofs etc.) with a minimum of weld lines, via the use of large inlay sheets.

A further advantage of the invention is that resin compositions with a relatively low density can be produced. Moreover they are particularly suitable for EMI shielding and parts with a Class-A surface can also be produced.

Another important advantage of the resin compositions according to the invention is that they are also eminently suitable for bulk processing, for example via processing by means of extrusion-compression (also referred to as "injection compression moulding" or "transfer-compression moulding").

In the radically curable resin mixture use is made in the invention of a radically curable resin (a). In general, resins that contain an unsaturation are radically curable. Examples of such resins are: vinyl ester resins, unsaturated-polyester resins and hybrid resins.

Suitable vinyl ester resins, also known as epoxy (meth) acrylates, that may be employed in the resin composition according to the invention, are addition products of polyepoxides and unsaturated carboxylic acids, preferably acrylic acid and methacrylic acid. Suitable polyepoxides are epoxy novolac resins and in particular polyepoxides based on bisphenol-A. A similarly suitable class of vinyl ester resins are the esterification products of alkoxylated bisphenol-A with (meth)acrylic acid. Examples of these are the ATLAC™ resins of DSM Composite Resins, Zwolle, the Netherlands)

Suitable unsaturated polyester resins that may be employed in the resin composition according to the invention are polyesters obtained by reaction of organic compounds that contain carboxyl and/or alcohol groups. At least one of the starting compounds then contains unsaturated compounds. Examples of these are the PALATAL™ resins of DSM Composite Resins.

Suitable hybrid resins that may be used in the resin composition according to the invention are resins that form a polyester-urethane hybrid network by reacting low-molecular starting compounds with each other in situ. Examples of these are the DARON™ resins of DSM Composite Resins.

Preferably, use is made in the invention of vinyl ester resins or unsaturated polyester resins.

The free monomer that is copolymerisable with the radically curable resin in the resin mixture contains one or more vinyl groups, and usually fewer than 50 carbon atoms. Examples of suitable copolymerisable free monomers are of the vinyl aromatic, vinyl ether, vinyl ester, acrylate and/or allyl type. Preferably, the free monomer is vinyl aromatic. Suitable vinyl aromatic monomers are for example styrene, α-methyl styrene, o-, m-, p-methyl styrene, p-chlorostyrene, t-butyl styrene, divinyl benzene, bromostyrene, vinyl naphthalene, α-chlorostyrene and divinylnaphthalene. Preferably, styrene is used.

The suitable amount of radically curable resin and copolymerisable free monomer in the resin mixture according to the invention is usually between 50 and 100 parts by weight relative to the total of (a) and (b) being 100 parts by weight. It is to be noticed, however, that in such cases where the amount of (a) is closer to 100 and that of (b) is closer to 0, handling of the radically curable resin pastes tends to become more difficult because of low values of viscosity. In such cases, and particularly in combination with a low amount of filler (i.e. at about 0–10 parts by weight relative to the total of (a) and (b)), one skilled in the art will, if desired, use other additives such as thixotropic agents (viscosity modifiers) or other amounts of copolymerisable free monomer (styrene) in order to adjust the viscosity of the resin mixture to such a suitable value that in the case of SMCs good wetting of the fibre bed is obtained and the resin composition can be well processed after thickening.

Suitable shrink-resistant compounds (b) in the resin composition according to the invention are thermoplastic polymers such as for example polyvinyl acetate, ethylene vinyl acetate, polystyrene, polyacrylates, such as for example polymethyl methacrylate, saturated polyesters, polyethylene, polyurethane, and rubbers on the basis of butadiene and styrene. Such shrink-resistant compounds are also known as "low profile additives" (LPA) or, in other sources, as "low shrink additives" (LSA). It is also possible to use a number of the above-mentioned polymers in carboxylated form, for example as co-polymer with ethylenically unsaturated carboxylic acids or the corresponding anhydride. Preferably, the shrink-resistant compound is a thermoplastic polymer and/or a styrene butadiene rubber. According to generally accepted definitions for LPA's and LSA's, these additives, when used in low shrink (LS) or low profile (LP) compositions, tend to show a linear shrinkage in the range of from +0.1 to 0 per cent (for LS), respectively in the range of from 0 to −0.12 per cent (for LP) when being cured. Negative values for shrinkage show that some expansion occurs at curing. It is further noticed, that LP compositions having a linear shrinkage in the range of from −0.06 to −0.12 per cent are also being referred to as Class-A compositions.

It is to be noticed, that the shrink-resistant compound used, and the amount of said shrink-resistant compound, will be chosen in such way, that effects of phase separation in the resin composition will be minimized. The skilled man can readily and without undue experimenting find such suitable shrink-resistant compound and amount thereof to be used for any specific application.

The amount of shrink-resistant compound (b) in the resin mixture according to the invention is between 0 and 50 parts by weight relative to the total of (a) and (b).

The amount of copolymerisable free monomer in (a) and (b) relative to the total of (a) and (b) will in general be less than 60% by weight, more particularly between 20–50% by weight. In the framework of the invention it is not critical whether use is made of a single copolymerisable tree monomer or of a mixture of copolymerisable free monomers. The free monomers (or mixtures of free monomers) present in (a) and (b) may be different.

Continuous carbon fibre bundles, as used herein, means fibres with a length that is much larger than the width or thickness of the carbon fibre bundle.

Split, continuous carbon fibre bundles in the context of the present invention means an assembly of a number of packages of (continuous) carbon filaments. One skilled in the art usually indicates the number of filaments of a fibre bundle or of packages obtained by splitting such a bundle by means of a K value, with each K indicating a thousand filaments. The split, continuous starting bundle used here thus has a much larger overall K value than that of each of the packages of carbon filaments obtained upon splitting. Each such package of carbon filaments preferably has a K value of between 1 and 12, most preferably between 3 and 12. The K values of the packages of carbon filaments present in the split, continuous carbon fibre bundles may in general vary by as much as 30–40%. The split, continuous carbon fibre bundles preferably have a K value of $\geq 20$, more preferably $\geq 40$, in total.

It has not to date been possible in practice to produce suitable compounds, for example SMCs, on the basis of resin compositions containing carbon fibre bundles with a K value higher than 12. In general, the distribution of the carbon fibre bundles, at a given width of the SMC and a given number of bobbins, then is insufficiently homogeneous and, when the width of the SMC is reduced—with an equal number of bobbins—to improve the homogeneity of the fibre loading, SMCs are obtained whose fibre bed, even at a relatively low fibre loading, is so thick that proper wetting is not possible. The same problem is encountered in other embodiments where fibre loading of a resin mixture must take place over a large width, for example when fibre material is added to a resin mixture in a long, narrow gap between two counter-rotating rolls. The length of the gap then approximately agrees with the width of the rolls.

The use of split, continuous carbon fibre bundles with sizing and binders as specified in this application (which leads to a suitable falling behaviour after chopping) now allows carbon fibres to be distributed over a wide area of the resin mixture, using fewer bobbins, without deterioration of the homogeneity of the fibre bed when SMCs are produced or without deterioration of the homogeneity of the fibre loading when rolls are used.

The carbon fibres in the split, continuous carbon fibre bundles that are used in the framework of the present invention are provided with a sizing that is at least partially chemically bonded thereto and with a binder whose solubility at room temperature in the copolymerisable free monomer present amounts to at least 10% by weight.

Because the sizing is at least partially anchored to the carbon fibres by a chemical reaction, that part of the sizing can in no case dissolve in copolymerisable free monomer that is present. The part of the sizing that is not chemically bonded to the carbon fibres may be wholly or partially insoluble in the copolymerisable free monomer. As a rule, only a limited part, for example less than 30% by weight, of the sizing will be chemically bonded to the carbon fibres.

In the framework of this invention binders are applied whose solubility at room temperature in the copolymerisable free monomer present amounts to at least 10% by weight. It is possible for the amount of binder used to be completely soluble in the free monomer. For the preparation of resin compositions intended for applications with Class-A properties (that is to say with very good surface properties) use will preferably be made of a binder whose solubility in the copolymerisable free monomer amounts to 10 to 30% by weight. For the preparation of resin compositions intended for applications in structural parts use will preferably be made of a binder whose solubility in the copolymerisable free monomer amounts to more than 30% by weight, more in particular preferably 50 to 75% by weight. The amount of sizing plus binder used generally is between 0.2 and 5% by weight relative to the amount of fibre. The sizing and the binder may be one and the same compound. In a narrower sense it would also be possible, in the framework of this application, to designate only the amount of sizing that is chemically bonded to the fibre bundles as sizing; the amount of the sizing that is not chemically bonded to the fibre bundles can therefore in fact also be considered to be binder. This taken been taken into account in the percentages stated in this application.

The percentage by weight of carbon fibre relative to the resin composition will generally be 5–65% by weight. Preferably, the percentage by weight of carbon fibre is either between 5 and 30% by weight or between 40 and 60% by weight, more preferably in the range from 45 to 58% by weight. A fibre loading below 30% by weight will generally be applied when Class-A properties are to be obtained. On the other hand, a fibre loading above 40% by weight will be chosen when structural applications are aimed at. When SMCs involve a combination of different loading types (for example isotropic and unidirectional fibre loading), then the total fibre loading may to a limited extent exceed the aforementioned limits. In the framework of the invention it is then possible to replace a proportion of the discontinuous fibres with continuous fibres.

Preferably, the chopped, split, continuous carbon fibre bundles have an average length of between 0.5 and 10 cm, preferably between 1 and 5 cm.

For components with very fine ribs and bosses, for example, it may be advantageous for the average length distribution of the chopped, split, continuous carbon fibre bundles to exhibit at least two distinct maxima. A distribution with two maxima is also known as a bimodal distribution.

An average length of the chopped, split, continuous carbon fibre bundles with at least two distinct maxima in the length distribution can for example be obtained by mixing (at least two) lots of continuous carbon fibre bundles that have been chopped to different average lengths. Such different average lengths of chopped carbon fibre bundles can be obtained for example by using at least two or more choppers. In the framework of the present invention a single chopper may also be used for this purpose, provided that at least a few of the distances between successive cutting blades in it are different.

A chopper is also understood to mean an assembly of two rolls that roll against each other and of which one roll is provided with cutting blades at fixed or selected distances (equal or different) from each other and of which the other (rubber) roll presses against the roll that is provided with blades.

As a rule, in the preparation of SMCs the chopped carbon fibre bundles are introduced in the resin matrix by allowing them to drop, on an SMC line, directly from one or more choppers onto the surface of (a first layer of) the resin mixture and covering them with the same resin mixture, after which the resin composition is passed between hold-down rolls (compacting unit) for impregnation.

It is also possible to add the chopped fibre bundles to a resin mixture in the gap between two counter-rotating rolls. The resin composition removed after passing the rolls can be fed in the form of a sheet to a compacting unit of a SMC line, or can be fed in bulk form to a mixing apparatus, for good impregnation of the fibre material. When mixing takes place in a mixing apparatus, for example in a kneader or an extruder, mixing should be controlled in such a way that the average length of the chopped carbon fibre bundles is not shorter than 0.5 cm. More in particular it is advisable for the average length of the chopped carbon fibre bundles not to be shorter than 2 cm.

One skilled in the art can readily establish which percentage by weight of carbon fibre, depending on the chosen average length of the carbon fibre and on the chosen resin mixture, produces the best results.

In general, at most 75% by weight of filler is present in the resin composition. In special cases it may be advantageous to use lower filler contents, for example less than 40% by weight, preferably less than 20% by weight, and still more preferably less than 5% by weight. In a special embodiment according to the invention less than 0.1% by weight of filler is used, more particularly less than 0.01% by weight. In principle, no filler needs to be present at all. For bulk processing the viscosity of the resin mixture is less critical and one skilled in the art as a rule needs to make less use of the above-mentioned additives.

Suitable fillers are for example calcium carbonate, kaolin, heavy spar, dolomite, crushed quartz, crushed slate, talc, aluminium trihydrate, glass beads, soot and sand. Fillers with a very low density may also be used, e.g. hollow glass beads.

In the framework of the present invention, fillers are not understood to include colouring agents, catalysts, accelerators, release agents, initiators and inhibitors, which obviously will also be present in the resin composition.

As a rule, the resin composition will also contain a thickener, certainly in the case of the preparation of SMCs and often also when bulk processing takes place. Such thickeners are known to one skilled in the art and comprise for example oxide and hydroxide of the metals in groups I, II and III of the Periodic System. Examples of suitable thickeners are oxide or hydroxide of magnesium, lithium and/or calcium.

Preferably, magnesium oxide is used. The amount of magnesium oxide that is added according to the invention is preferably larger than 1.5 parts by weight relative to the resin mixture. Thickening may also be accomplished via a reaction of the resin with (di)isocyanate compounds present in the resin mixture. This is especially suitable where vinyl ester resins and hybrid resins are thickened.

Suitable thixotropic agents are aerosils, colloidal silica, strongly reactive silicic acids, bentones, calcium stearate and hydrogenated oils, for example castor oil.

The amounts of catalysts, accelerators, release agents, initiators and inhibitors and of thickeners and any thixotropic agents used, are those customarily used for radically curable resins. In general, they total about 5 to 20 parts by weight relative to 100 parts of radically curable resin mixture (i.e. the sum of (a) and (b)). As a rule, when isocyanate-thickening is applied, the number of parts by weight of (di)isocyanate compound(s) is between 10 and 45 parts relative to 100 parts of radically curable resin mixture. The amount of the other additives in that case remains the same. As a rule, a small amount of a water scavenger, for example Baylith powder or another molecular sieve, is then added. One skilled in the art can easily determine this.

In the framework of this invention it is also possible to add, besides the split, continuous carbon fibre bundles, other reinforcing materials to the resin composition. Suitable reinforcing materials are for example shredded lamellar materials, such as for example mica, or other fibres of natural or synthetic origin, for example aramid fibres, polypropylene fibres, polyethylene terephthalate (PET-P) fibres, glass fibres, etc. If desired, these additional fibres may also be added uni-directionally in the preparation of SMCs.

The invention also relates to a process for the manufacture of a thermosetting resin composition, in which split, continuous carbon fibre bundles are chopped in a chopper, with the carbon fibre bundles prior to chopping being provided with a sizing that is at least partially chemically bonded thereto and with a binder, and are added to a radically curable resin mixture consisting of:

(a) 50–100 parts by weight of a radically curable resin that also contains a free monomer capable of copolymerising with it
(b) 0–50 parts by weight of a shrink-resistant compound that may also contain an amount of copolymerisable free monomer, the total of (a) and (b) adding up to 100, as well as optionally an amount of filler,
the binder's solubility at room temperature in the copolymerisable free monomer present amounting to at least 10% by weight and the chopped, split, continuous carbon fibre bundles being distributed 2D-randomly and homogeneously therein by either
1) allowing them to drop onto the resin mixture on an SMC line and covering them with the same resin mixture, or
2) adding them to the resin mixture in a gap between two counter-rotating rolls, followed by an impregnation step in a compacting unit or in a mixing apparatus.

The impregnation step in a mixing apparatus will be used in particular in the preparation of the compounds in bulk form.

The split, continuous carbon fibre bundles preferably are introduced into the chopper a few centimetres apart.

The packages of continuous carbon filaments used in the process according to the invention have a K value of between 1 and 12, preferably between 3 and 12, and are obtained by splitting unsplit, continuous carbon fibre bundles with a K value of ≧20, preferably The resin composition thus obtained is suited for use in the manufacture of 3D moulded articles. These moulded articles in general will have a thickness of at least 1 mm. The moulded articles have exceptionally good mechanical properties, good temperature resistance, excellent dimensional stability at high temperature and favourable fatigue properties. In a special embodiment of the invention these good mechanical and other properties are coupled with low weight. As compared with glass-SMC's for structural applications, weight reductions of up to 50–65% can be achieved. Also, the carbon fibres are homogeneously distributed in particular areas of the 3D moulded article such as ribs and bosses. The process according to the invention has been found to be well capable of producing moulded articles with Class-A surface characteristics with high concentrations of filler (for example 60 to 75% by weight relative to the resin composition) and of shrink-resistant compound (for example 30 to 40% by weight of the resin mixture). In those cases a binder will preferably be used in the split, continuous carbon fibre bundles of which less than 30% by weight dissolves in the copolymerisable free monomer present and a fibre loading below 30% by weight will be applied.

The invention therefore also relates to the use of curable resin compositions according to the invention (or prepared by the process thereof) for manufacturing moulded articles.

The moulded articles according to the invention may be used as enclosure for electronics with adequate EMI shielding. In addition, the moulded articles may be used as body panels for cars, as inner and/or outer shell for sandwich panels and as (semi)structural parts in cars or other vehicles.

It is noted that JP-A-8-311242 describes electrically conductive thermosetting resin compositions (SMCs reinforced with short −0.1 to 1 cm-fibres) that are mainly used as enclosure for electronics with EMI shielding. The resin compositions according to the invention provide equal or even better EMI shielding than the products described in JP-A-8-311242 at a much lower carbon. fibre loading.

The invention will now be illustrated by some examples, without however being limited to the compositions shown in the examples.

EXAMPLE I

A resin mixture based on a vinyl ester (Atlac XP 810, DSM Composite Resins, Zwolle, the Netherlands) with the following composition was prepared:

| | |
|---|---|
| Atlac XP 810 | 70 parts |
| Palapreg H814 | 30 parts LPA from DSM Composite Resins |
| Calcium carbonate | 5 parts (filler) |
| Trigonox C | 1.5 parts of initiator from AKZO Nobel |
| p-Benzoquinone (PBQ) | 0.4 part (of a 10% solution) |
| Zn stearate | 5 parts |
| MgO | 2.8 parts (thickener) |

The amount of resin mixture was split in 2 parts, and, using a doctor blade, spread to form a resin film on 2 polyethylenelpolyamide carrier films.

The split, continuous carbon fibre bundles with a styrene-soluble binder (K value 80, split into 10 packages of 8K on average) from 14 bobbins were introduced into the chopper while spaced 4 cm apart above the bottom resin layer. The carbon fibre bundles were cut with rotating blades into packages of filaments approximately 2.5 cm long.

On the bottom resin layer a 2D-randomly distributed and homogeneous fibre bed with a width of 50 cm was obtained. Next, the second resin layer was applied onto the fibre bed, after which the fibre material was impregnated with the resin mixture in a compacting unit. The sheet-shaped resin composition thus obtained was subsequently coiled. A carbon fibre loading of 52% by weight was achieved. Good wetting of the 8K packages with the resin mixture was distinctly visible up to the individual filaments.

Thickening of the compound obtained took place in 10 days, after which the resin composition was moulded into a flat sheet using a mould coverage of 40%. A homogeneously black-coloured sheet was the result.

Test specimens were sawn from the flat sheet obtained, and these were subsequently subjected to a bending test and an ILSS test.

Results of bending test (ISO 178):
Flexural modulus 33 GPa
Flexural strength 500 MPa Results of ILSS test (ASTM 2344):
68 MPa The density of the material obtained was 1.39 g/cm$^3$.

EXAMPLE II (EMI SHIELDING)

Using the same resin mixture as in Example I and the same split, continuous carbon fibre bundle, a compound was made containing 25% by weight of carbon fibres with a length of approximately 2.5 cm.

After thickening for 12 days a number of flat sheets were moulded with a mould coverage of 40% and with the following thicknesses 1.4 mm, 2.8 mm and 5.8 mm.

The shielding efficiency was measured in accordance with ASTM 4935 in the frequency range between 30 MHz and 1 GHz.

The shielding curves have a smooth profile across a wide frequency range. A number of characteristic values of these curves are shown in the table.

TABLE 1

EMI shielding as a function of frequency for various sheet thicknesses.

| | Shielding (dB) for various sheet thicknesses | | |
|---|---|---|---|
| Frequency | 1.4 mm sheet | 2.8 mm sheet | 5.8 mm sheet |
| 30 MHz | 64 | 85 | 100 |
| 100 MHz | 65 | 89 | 105 |
| 300 MHz | 77 | 90 | 110 |
| 500 MHz | 87 | 93 | 108 |
| 700 MHz | 88 | 96 | 110 |
| 1 GHz | 87 | 98 | 110 |

Comparative Example A

Using the resin mixture of Example I, carbon fibre bundles from 14 bobbins with an unsplit 24K carbon fibre bundle were chopped to a length of approximately 2.5 cm above the bottom resin bed.

The fibre bundles were spaced 4 cm apart as in Example I. Instead of a homogeneous fibre bed over a width of 50 cm, what was now obtained were rather 14 "ridges" of fibre material, in between which were areas where scarcely any fibre bundles were to be found. A carbon fibre loading of 48% by weight was achieved. To avoid such areas, the distance between the bundles in the chopper had to be reduced. Only when the bundles were spaced 1.5 cm apart could a homogeneous fibre distribution be achieved (the width of the SMC obtained then was approx. 20 cm).

However, impregnation of this 20 cm wide fibre bed was found to be not well possible, as appeared from the high proportion of dry fibre bundles that were still present after the compacting unit.

Comparative Example B

Using the resin mixture of Example I, split, continuous carbon fibre bundles with a non-styrene-soluble binder (48K, split into 7 packages of 7K on average) from 14 bobbins were cut to a length of approximately 2.5 cm.

Under identical conditions to those in Example I, a 50 cm wide C-SMC was thus made with a carbon fibre loading of 52% by weight.

After the compound had thickened for 10 days, a flat sheet was moulded using a mould coverage of 40%, from which a number of test bars were sawn for a bending test. On the surface of the flat sheet (and the test bars) areas were clearly perceptible where there were scarcely any carbon fibres (light-yellow in colour). As a result the strength of the material was relatively low.

The results of the bending test according to ISO 178 were:

Flexural strength: 200 MPa±40 MPa

Flexural modulus: 31 GPa.

The ILSS (ASTM 2344) was 59 MPa.

EXAMPLE III

A resin mixture based on maleate resin (Palapreg 0423-N-2, DSM Composite Resins) was prepared, with the following composition:

| | |
|---|---|
| Palapreg 0423-N-2 | 64 parts |
| Neulon LP40A | 33 parts polyvinyl acetate LPA from Union Carbide Chemicals |
| Coathylene HA 1681 | 3 parts polyethylene from Plast Labor S |
| Styrene | 3 parts |
| BYK W 996 | 2 parts wetting agent from BYK Chemie |
| Calcium carbonate | 190 parts (filler) |
| Trigonox C | 1.6 parts initiator from AKZO Nobel |
| Trigonox 21 LS | 0.2 parts initiator from AKZO Nobel |
| p-Benzoquinone (PBQ) | 0.35 parts (of a 10% solution) |
| Ca stearate | 5 parts |
| MgO | 2.7 parts (thickener) |

The amount of resin mixture was divided into 2 parts and, using a doctor knife, spread out to form a 30-cm wide resin film on 2 calender rolls.

The split, continuous carbon fibre bundles with a styrene-soluble binder (K value 80, split into 10 packages of on average 8K) from 8 bobbins were introduced into the chopper above the calender gap while being spaced 4 cm apart. The carbon fibre bundles were cut with rotating knives into filament packages of approximately 2.5 cm length.

The chopped fibres fell randomly distributed onto the resin layers on the rolls after which the fibre material together with the resin mixture passed through the gap between the 2 rolls and was impregnated with the resin mixture. The bulk resin composition thus obtained was removed from the rolls by means of scrapers and packed.

A carbon fibre loading of 17% by weight was achieved. Good wetting of the 8K packages with the resin mixture was distinctly visible up to the individual filaments.

Thickening of the obtained compound took place in 7 days, after which the resin composition was moulded into a flat sheet. A homogeneously dark-grey coloured sheet was the result.

From the flat sheet obtained test specimens were sawn, which were subsequently subjected to a bending test.

Results of bending test (ISO 178):

Flexural modulus 20 GPa

Flexural strength 200 MPa

The density of the material obtained was 1.79 g/cm$^3$.

Comparative Example C

Using the resin mixture of Example III, carbon fibre bundles from 8 bobbins with a non-split 24K carbon fibre bundle were now cut above the calender to a length of approximately 2.5 cm. The distance between the fibre bundles was 4 cm, as in Example III. Instead of a homogeneous fibre distribution over a width of 30 cm, now rather 8 "stripes" of fibre material were obtained, with in between them areas where scarcely any fibre bundles were to be found. A carbon fibre loading of 16% by weight was found. To avoid the formation of such areas with and without fibre bundles, the distance between the bundles in the chopper had to be reduced. When the bundle spacing was smaller than 1.5 cm a more homogeneous fibre distribution could be achieved, but impregnation of the fibres was found to be not well possible, which appeared from the large proportion of dry fibre bundles that were still present in the bulk compound obtained.

EXAMPLE IV

Example I was repeated without any LPA being present. The resin mixture used had the following composition:

| | |
|---|---|
| Atlac XP 810 | 100 parts |
| Calcium carbonate | 5 parts (filler) |
| Trigonox C | 2.1 parts of initiator from AKZO Nobel |
| p-Benzoquinone (PBQ) | 0.6 part (of a 10% solution) |
| Zn stearate | 5 parts |
| MgO | 4 parts (thickener) |

The same compounding procedure and split, continuous carbon fibre bundles as in Example I were applied.

A carbon fibre loading of 52% by weight was achieved. Good wetting of the 8K packages with the resin mixture was distinctly visible up to the individual filaments.

Thickening of the compound obtained took place in 10 days, after which the resin composition was moulded into a flat sheet using a mould coverage of 40%. A homogeneously black-coloured sheet was the result.

Test specimens were sawn from the flat sheet obtained, and these were subsequently subjected to a bending test and an ILSS test.

Results of bending test (ISO 178):
Flexural modulus 33 gpa
flexural strength 530 mpa
Results of ILSS test (ASTM 2344):
68 mpa

What is claimed is:

1. A thermosetting resin SMC article comprising a thermosetting resin composition containing a radically curable resin mixture as matrix, in which 2D-randomly distributed, discontinuous carbon fibres and other additives are present, wherein the radically curable resin mixture consists of:
    (a) 50–100 parts by weight of a radically curable resin that also contains a free monomer capable of copolymerising with it
    (b) 0–50 parts by weight of a shrink-resistant compound that may also contain an amount of copolymerisable free monomer, the total of (a) and (b) adding up to 100,
    and in that the discontinuously distributed carbon fibres are obtained by chopping split, continuous carbon fibre bundles, which carbon fibre bundles are provided with a sizing that is at least partially chemically bonded thereto and with a binder whose solubility at room temperature in the copolymerisable free monomer present in the radically curable resin mixture amounts to at least 10% by weight,
    and in that the weight percentage of carbon fibres relative to the resin composition is between 5 and 65% by weight, wherein the sizing and binder may be the same component or different ones,
    and in that optionally also a filler is present in the resin composition.

2. A thermosetting resin SMC article according to claim 1, wherein the discontinuously distributed carbon fibres are obtained by chopping split, continuous carbon fibre bundles having a K value of $\geq 20$, in total, and are composed of packages of carbon filaments each having a K value of between 1 and 12.

3. A thermosetting resin SMC article according to claim 1, wherein the radically curable resin is a vinylester resin or an unsaturated polyester resin.

4. A thermosetting resin SMC article according to claim 1, wherein the copolymerisable free monomer in (a) and, optionally in (b), is styrene.

5. A thermosetting resin SMC article according to claim 1, wherein the shrink-resistant compound is chosen from thermoplastic polymers and/or styrene-butadiene rubbers.

6. A thermosetting resin SMC article according to claim 1, wherein the weight percentage of carbon fibres relative to the resin composition is either between 5 and 30% by weight or between 40 and 60% by weight. by-weight.

7. A thermosetting resin SMC article according to claim 1, wherein the average length of the chopped, split, continuous carbon fibre bundles is between 0.5 and 10 cm.

8. A thermosetting resin SMC article according to claim 7, wherein the average length of the chopped, split, continuous carbon fibre bundles is not shorter than 2 cm.

9. A thermosetting resin SMC article according to claim 7, wherein at the average length distribution of the chopped, split, continuous carbon fibre bundles there are at least two maxima in the length distribution.

10. A thermosetting resin SMC article according to claim 1, wherein the amount of filler is at most 75% by weight relative to the resin composition.

11. A thermosetting resin SMC article according to claim 10, wherein less than 5% by weight, of filler is present in the resin composition.

12. A thermosetting resin SMC article according to claim 10, wherein less than 0.1% by weight of filler is present in the resin composition.

13. A thermosetting resin SMC article according to claim 10, wherein less than 0.01% by weight of filler is present in the resin composition.

14. A thermosetting resin SMC article according to claim 1, wherein the sizing and the binder are one and the same compound.

15. A thermosetting resin SMC article according to claim 1, wherein the discontinuously distributed carbon fibres are obtained by chopping split, continuous carbon fibre bundles having a K value of $\geq 40$, in total, and are composed of packages of carbon filaments each having a K value of between 3 and 12.

16. A thermosetting resin SMC article according to claim 1, wherein the discontinuously distributed carbon fibres are obtained by chopping split, continuous carbon fibre bundles having a K value of $\geq 20$, in total, and are composed of packages of carbon filaments each having a K value of between 3 and 12.

17. A thermosetting resin SMC article according to claim 1, wherein the discontinuously distributed carbon fibres are obtained by chopping split, continuous carbon fibre bundles having a K value of $\geq 40$, in total, and are composed of packages of carbon filaments each having a K value of between 1 and 12.

18. A thermosetting resin SMC article according to claim 1, wherein the weight percentage of carbon fibres relative to the resin composition is between 45 and 58% by weight.

19. A thermosetting resin SMC article according to claim 1, wherein the average length of the chopped, split, continuous carbon fibre bundles is between 1 and 5 cm.

20. Process for manufacturing a 3D-moulded article, comprising moulding a thermosetting resin composition containing a radically curable resin mixture as matrix, in which 2D-randomly distributed, discontinuous carbon fibres and other additives are present, said radically curable resin mixture comprising:
  (a) 50–100 parts by weight of a radically curable resin that also contains a free monomer capable of copolymerising with it,
  (b) 0–50 parts by weight of a shrink-resistant compound that may also contain an amount of copolymerisable free monomer, the total of (a) and (b) adding up to 100 parts by weight, wherein the discontinuously distributed carbon fibres are obtained by chopping split, continuous carbon fibre bundles, which carbon fibre bundles are provided with a sizing that is at least partially chemically bonded thereto and with a binder whose solubility at room temperature in the copolymerisable free monomer present in the radically curable resin mixture amounts to at least 10% by weight, and
  (c) the weight percentage of carbon fibres relative to the resin composition is between 5 and 65% by weight, and, optionally,
  (d) a filler, to form a 3D molded article.

21. A process for the preparation of a thermosetting resin SMC article containing a radically curable resin mixture as matrix, in which 2D-randomly distributed, discontinuous carbon fibres and other additives are present, wherein split, continuous carbon fibre bundles are chopped in a chopper to form packages of carbon filaments, with the carbon fibre bundles prior to chopping being provided with a sizing that is at least partially chemically bonded thereto and with a binder, which may be the same component as the sizing or different therefrom, and are added to a radically curable resin mixture consisting of:
  (a) 50–100 parts by weight of a radically curable resin that also contains a free monomer capable of copolymerising with it,
  (b) 0–50 parts by weight of a shrink-resistant compound that may also contain an amount of copolymerisable free monomer, the total of (a) and (b) adding up to 100,
  as well as optionally an amount of filler, the binder's solubility at room temperature in the copolymerisable free monomer that is present amounting to at least 10% by weight, and the chopped, split, continuous carbon fibre bundles being distributed 2D-randomly and homogeneously therein by either
    1) allowing them to drop on an SMC line onto the resin mixture and covering them with the same resin mixture, or
    2) adding them to the resin mixture in a gap between two counter-rotating rolls followed by an impregnation step in a compacting unit or in a mixing apparatus.

22. A process for the preparation of a thermosetting resin SMC article according to claim 21, wherein the packages of continuous carbon filaments each have a K value of between 1 and 12, and are obtained by splitting unsplit continuous carbon fibre bundles having a K value of $\geq 20$, in total.

23. A process for the preparation of a thermosetting resin SMC article according to claim 21, wherein the packages of continuous carbon filaments each have a K value of between 3 and 12, and are obtained by splitting unsplit continuous carbon fibre bundles having a K value of $\geq 20$, in total.

24. A process for the preparation of a thermosetting resin SMC article according to claim 21, wherein the packages of continuous carbon filaments each have a K value of between 3 and 12, and are obtained by splitting unsplit continuous carbon fibre bundles having a K value of $\geq 40$, in total.

25. A process for the preparation of a thermosetting resin SMC article according to claim 21, wherein the packages of continuous carbon filaments each have a K value of between 1 and 12, and are obtained by splitting unsplit continuous carbon fibre bundles having a K value of $\geq 40$, in total.

* * * * *